(12) United States Patent
Belinsky

(10) Patent No.: US 7,661,922 B2
(45) Date of Patent: Feb. 16, 2010

(54) INSTALLATION FOR HARVESTING ENERGY OF TIDES (IHET) IN SHALLOW WATERS

(76) Inventor: Sidney Irving Belinsky, 353 Southampton C, West Palm Beach, FL (US) 33417

(*) Notice: Subject to any disclaimer, the term of this patent is extended or adjusted under 35 U.S.C. 154(b) by 185 days.

(21) Appl. No.: 11/174,789

(22) Filed: Jul. 5, 2005

(65) Prior Publication Data

US 2006/0008351 A1    Jan. 12, 2006

Related U.S. Application Data

(60) Provisional application No. 60/585,695, filed on Jul. 6, 2004.

(51) Int. Cl.
*F03B 15/06* (2006.01)

(52) U.S. Cl. .................... 415/4.3; 415/7; 415/908; 416/85

(58) Field of Classification Search .............. 415/3.1, 415/4.3, 4.5, 7, 8, 124.1, 221, 908; 416/85, 416/120, 170 R, 198 R; 475/160, 161; 290/43, 290/54

See application file for complete search history.

(56) References Cited

U.S. PATENT DOCUMENTS

| 386,255 | A | * | 7/1888 | McCarty | 415/126 |
|---|---|---|---|---|---|
| 532,595 | A | * | 1/1895 | Seivert et al. | 415/7 |
| 707,857 | A | * | 8/1902 | Marburg | 416/85 |
| 772,383 | A | * | 10/1904 | Siemers | 415/7 |
| 808,034 | A | * | 12/1905 | Franklin | 416/170 R |
| 3,978,345 | A | * | 8/1976 | Bailey | 290/54 |
| 4,137,005 | A | * | 1/1979 | Comstock | 415/24 |
| 4,151,424 | A | * | 4/1979 | Bailey | 290/54 |
| 4,659,940 | A | * | 4/1987 | Shepard | 290/55 |
| 5,451,137 | A | * | 9/1995 | Gorlov | 415/7 |
| 5,642,984 | A | * | 7/1997 | Gorlov | 416/176 |
| 5,946,909 | A | * | 9/1999 | Szpur | 60/398 |
| 5,989,143 | A | * | 11/1999 | Bell et al. | 475/160 |
| 6,036,443 | A | * | 3/2000 | Gorlov | 416/176 |
| 6,579,202 | B2 | * | 6/2003 | El-Antably et al. | 475/159 |
| 2002/0090270 | A1 | * | 7/2002 | Malcolm et al. | 405/195.1 |
| 2003/0049077 | A1 | * | 3/2003 | Geiger et al. | 405/195.1 |
| 2005/0001432 | A1 | * | 1/2005 | Drentham Susman et al. | 290/43 |

* cited by examiner

*Primary Examiner*—Edward Look
*Assistant Examiner*—Aaron R Eastman

(57) ABSTRACT

Installations for harvesting energy of river and ocean tidal currents consist of multiple Darrieus type turbines with funnels, which are located inline on the river or ocean bottom and oriented perpendicular to direction of water movement due to tide or river current. Use of Darrieus type turbines with funnels significantly increases efficiency of energy utilization of water streams in comparison versus system not utilizing funnels. Use of greater number of Darrieus turbines operating in line allows to utilize more powerful gearbox and generator, thus improving economics of their operation. For the purpose of simplification the regular maintenance of the system the generator and all auxiliary systems are located above water, except 90-degrees gearbox. To prevent water entering 90-degrees gearbox it always is under air pressure slightly above hydrostatic pressure of water above it. To prevent lost of power generating capacity, due to accommodation of the growth on the turbine blades surface, special blade-cleaning machine operating in semi-automated mode is introduced.

6 Claims, 20 Drawing Sheets

Section H-H

Section G-G

Section F-F

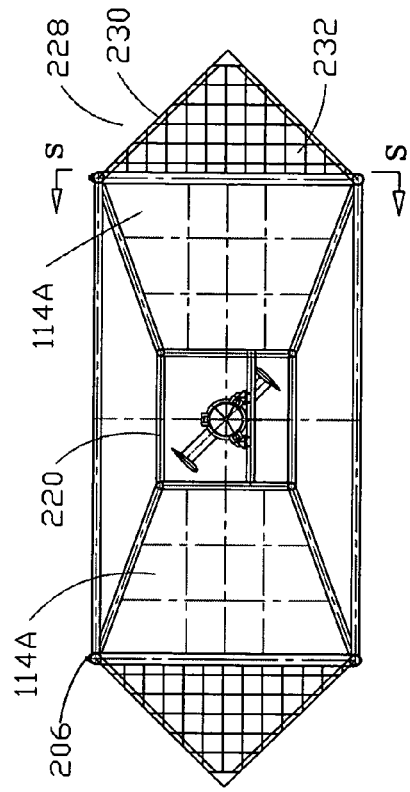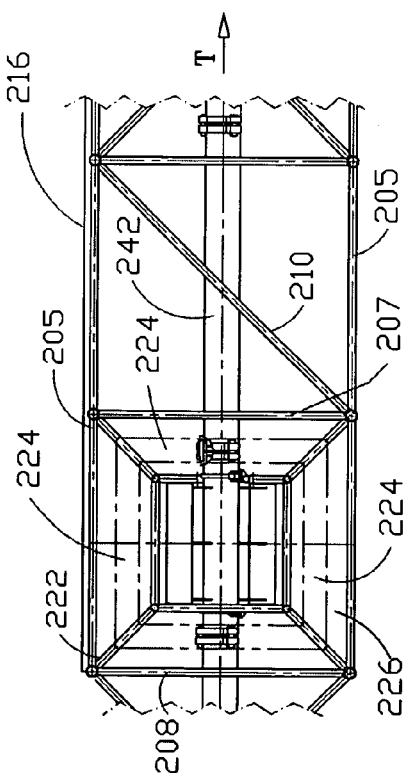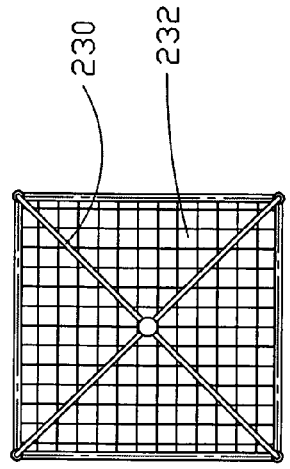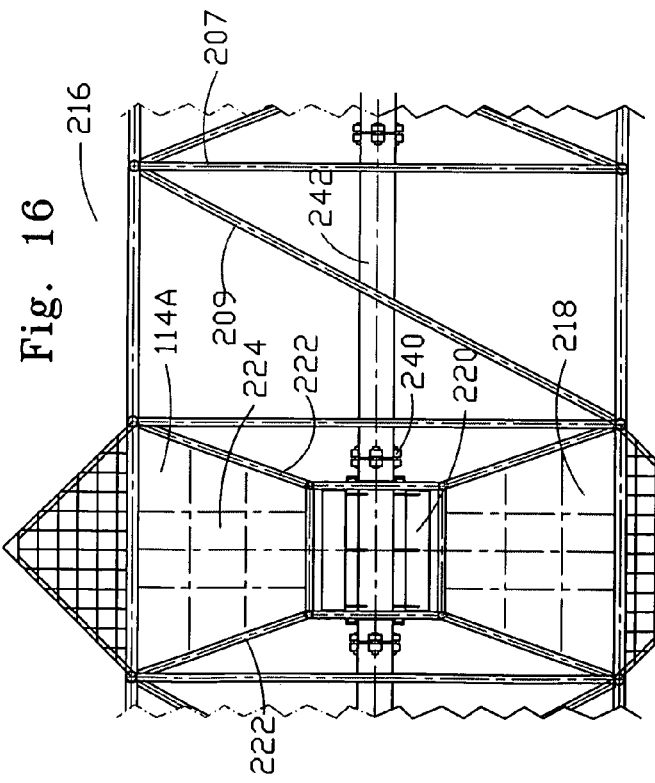

Figure 1:
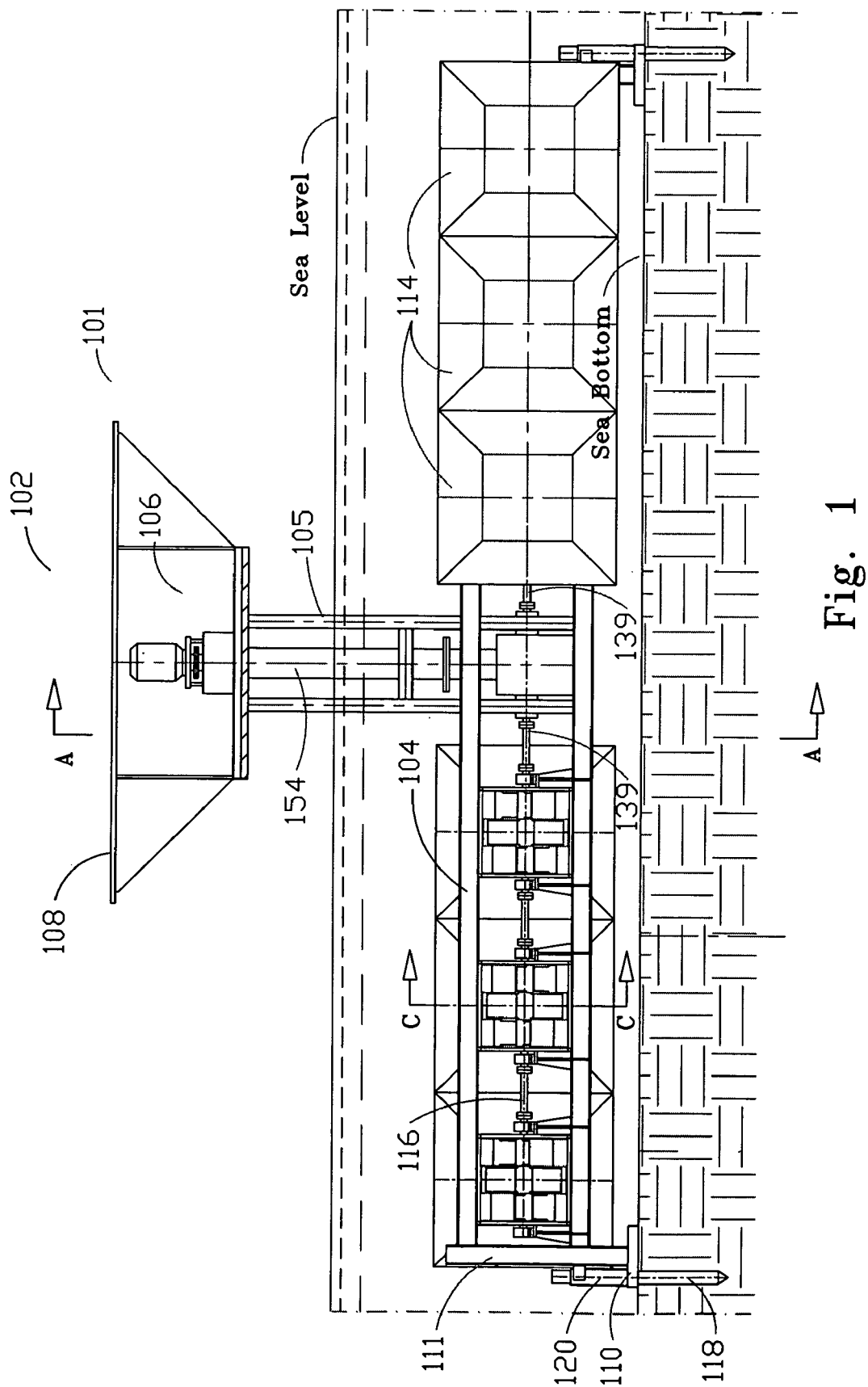

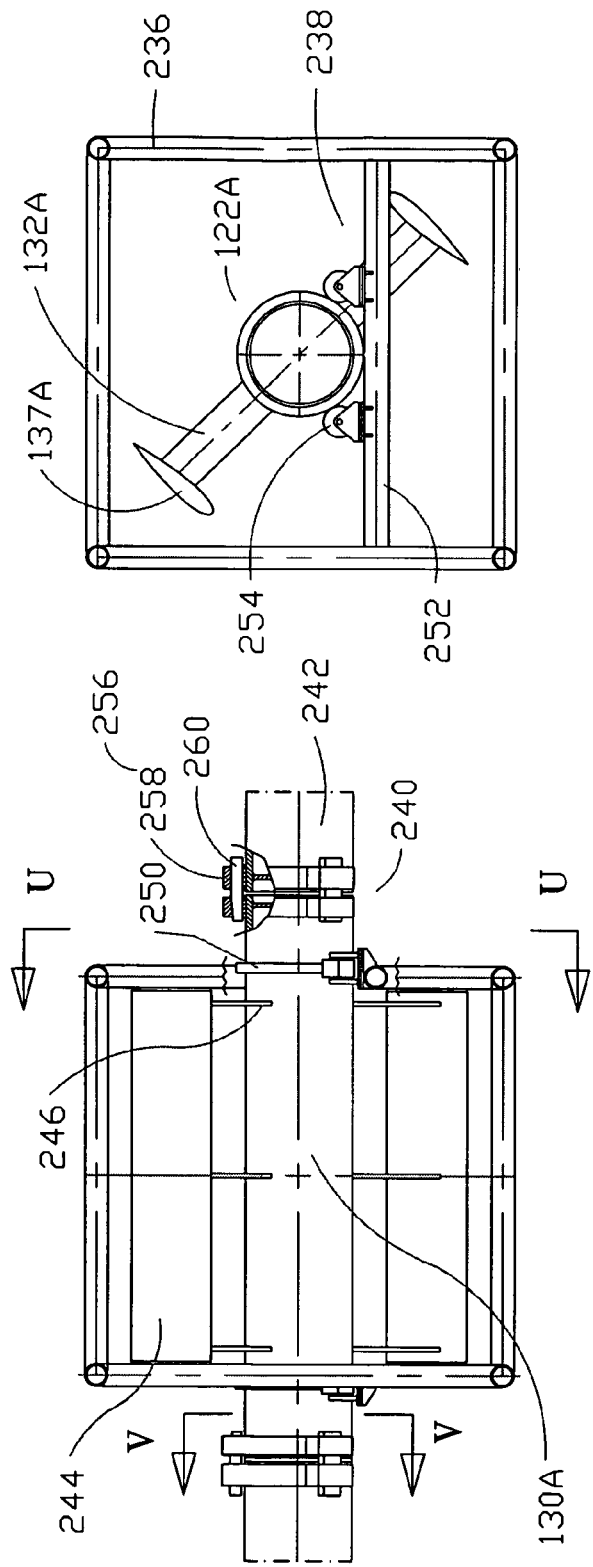
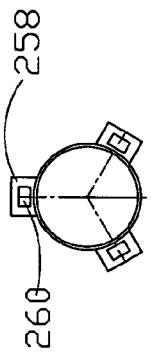
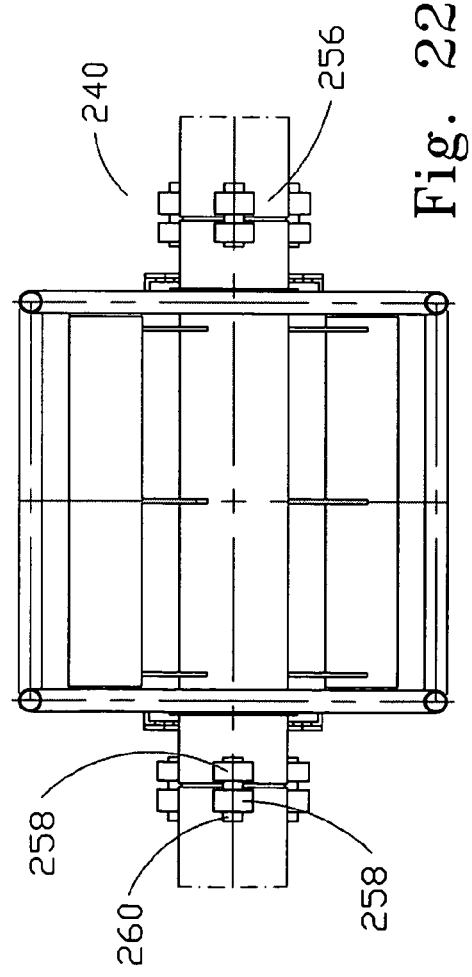
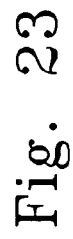
Fig. 20
Fig. 21
Fig. 22
Fig. 23

INSTALLATION FOR HARVESTING ENERGY OF TIDES (IHET) IN SHALLOW WATERS

CROSS REFERENCE TO RELATED APPLICATION

This application is related to provisional application Ser. No. 69/585,695 entitled "System for harvesting kinetic energy of water streams in shallow waters" filed Jul. 6, 2004, which is incorporated herein in reference.

BACKGROUND

1. Field of the Invention

This invention relates to harvesting kinetic energy of rivers and ocean tidal currents in shallow waters and it is based on the utilization of Darrieus type turbines.

2. Discussion of Prior Art

The most of the known installations for harvesting kinetic energy of the water streams, which are originated by tides or rivers in shallow waters, are of two types. One type is using Propeller-turbines with horizontal axis of rotation the other type is using Darrieus hydro-turbines with vertical orientation of their axis of rotation. The specific of Darrieus hydro-turbines is that they rotate always in one direction, regardless of water flow direction. The propeller-turbines, in case of their application for harvesting tidal energy, have to have special provisions to accommodate 180° change in the direction of water flow.

The propeller-turbines type installation have horizontal axis of rotation and usually are located bellow water level on the sea or river bottom. Thus allows timber rafting and ice drifting to flow above them and also to minimize effect of waves actions on their structures. However, since the multiplicator and generator are on the same axis with propeller and are located underwater, this requires placing them in hermetic capsule. The need for hermetic capsule, besides significant complication of performing regular maintenance, creates the possibility of multiplicator some day flooding. Thus makes the systems requiring use hermetic capsule not reliable for a prolong use.

The vertical orientation of Darrieus type turbines allows locating their multiplicator and generator above water and by this providing advantage of simplifying the process of their maintenance. Also advantage of Darrieus turbine versus propeller-turbines is that in cases when depth of water limits the size of turbine the square shape of Darrieus turbine has about 20% larger area. These advantages in many cases outweigh the drawback of being obstacle to timber rafting and ice drifting.

The Darrieus type turbine that was patented in 1927 (U.S. Pat. No. 1,835,018) was widely used for harvesting kinetic energy of the wind. Only in the beginning of 1980ries the Canadian Company Nova Energy, Ltd. pioneer used of Darrieus turbines for harvesting energy of water streams. Their basic design (see website—bluenergy.com) utilizes vertically oriented turbine into a frame that is connected to the sea bottom. This limits their use to shallow water straits and rivers.

The other company that presently uses Darrieus turbine in their projects is GCK Technologies Inc. Its systems are described in the U.S. Pat. No. 6,036,443, issued to Alexander Gorlov. Specific of this patented turbine is in the use of helical blade instead of conventional straight blade of Darrieus turbine. The goal of using helical blade is to provide to turbine self-staring capability. Presently all 2 and 3 blades Darrieus turbines used for harvesting wind energy and converting it to electricity are started by a motor. Since this motor, after turbine reaches synchronous speed of AC power in the grid, starts to operate, as generator the absence of self-starting capability is not a problem at all for systems supplying electricity in power grid.

Installations for harvesting kinetic energy of water streams shown in Gorlov U.S. Pat. No. 6,036,443 are located underwater, thus making them vulnerable for flooding and are not accessible for frequent maintenance. Gorlov also came up with submerged floating system that can be anchored in deep waters to sea bottom by mooring lines. This floating system is described in article "Helical Turbines for the Gulf Stream: Conceptual Approach to Design of a Large-Scale Floating Power Farm", see Marine Technology, Vol. 35, July 1998, pp. 175-182.

The US Patent Installation for Harvesting Ocean Currents (IHOC) U.S. Pat. No. 6,856,036 B2, issued on Feb. 15, 2005 to Sidney Belinsky, who is also author of instant invention, illustrates application of vertically oriented Darrieus turbine for harvesting energy of ocean currents in deepwaters. It also it illustrates use of funnel in combination with turbine, which increases the speed of water passing through the turbine. The turbine wheel design consists of 3 two-straight blade turbines staggered on 120 degrees and assembled on one shaft. Thus forms a six-blades turbine that has the self-starting capability and delivers smoother torque distribution during one rotation. At the same time two-blade Darrieus turbine have higher efficiency that 3-4 blades turbines used by Blue Energy Canada and GCK Technology, Inc.

OBJECTIVES OF THE INSTANT INVENTION

The main objective of IHET invention is to create a more efficient and more practical system for harvesting kinetic energy of ocean tides and rivers in shallow waters, by overcoming the major drawbacks of the all presently known systems for harvesting tidal and rivers current kinetic energy.

The first drawback:—the shallow waters restrict the sizes of propeller-turbines diameter and the depth of vertical Darrieus turbines and this correspondingly limits their power output. Since each propeller-turbine and vertically oriented Darrieus turbine required multiplicator and generator the initial capital cost per KW/Hour of generated electricity becomes too high to be competitive with fuel burning power plants.

The second drawback:—Large number of small power plants increases maintenance cost, especially due to marine environment in which they have to operate. It is expected that located underwater system would experience, besides corrosion, the growth on the blades surface that would significantly affect the efficiency of their operation. Removing these growths from blades surfaces is time consuming and expensive operation, since at the present time divers do it manually.

The instant invention IHET approaches the first drawback by locating several Darrieus turbines on one line (shaft) parallel to sea bottom and perpendicular to the water flow direction. By using 90 degrees gearbox on the sea bottom it becomes possible to orient rotation of output shaft vertically and by this allowing location of generator and all auxiliary systems above water level. Thus would allow transmitting rotation of many turbines through one gearbox and one generator and by this significantly reducing capital cost per KW/Hour of electricity generated.

The second drawback (increase in maintenance cost) the instant invention IHET approaches by reducing the number of gearboxes and generators to be served, as the result of increasing number of turbines rotating one gearbox and one generator. It also provides a means for cleaning turbines blades surface from growth on their surface in a semi-automated mode by a special machine, which besides reducing maintenance cost also would allow to keep efficiency of turbine closed to initial condition. To simplify maintenance of 90-degree gearbox, which is positioned underwater, a special provision is made to complete all required routine maintenance of the gearbox (regularly changing oil and oil filters) from the powerhouse located above water.

SUMMARY OF THE INSTANT INVENTION

The instant invention is demonstrated by two Embodiments.

Embodiment I demonstrates application for installation in places far away from coastal lines. Embodiment II demonstrates application for it installations in straits and rivers, where string of underwater turbines are located perpendicular to water flow and one end of their common shaft is coming to the strait or river shoreline.

Both Embodiments have similar design of their submerged frames, inside of each are located several Darrieus turbines interconnected to each other through their shafts and arranged in line. The underwater frames are installed parallel to sea bottom and perpendicular to direction of water movement. They have at least two points by which they are connected to sea bottom and means for undertaking current force. Depending on the soil conditions the instant invention illustrates two options for case with soft soil and case with hard soil. Embodiment I illustrate case with soft soil at which the current force is undertaken by at least 4 piles driven in sea bottom. Embodiment II illustrate case with hard soil at which the current force is undertaken by at least 4 anchoring lines and 4 gravity anchors.

BRIEF DESCRIPTION OF IHET (EMBODIMENT I) DRAWINGS

Figure 2:
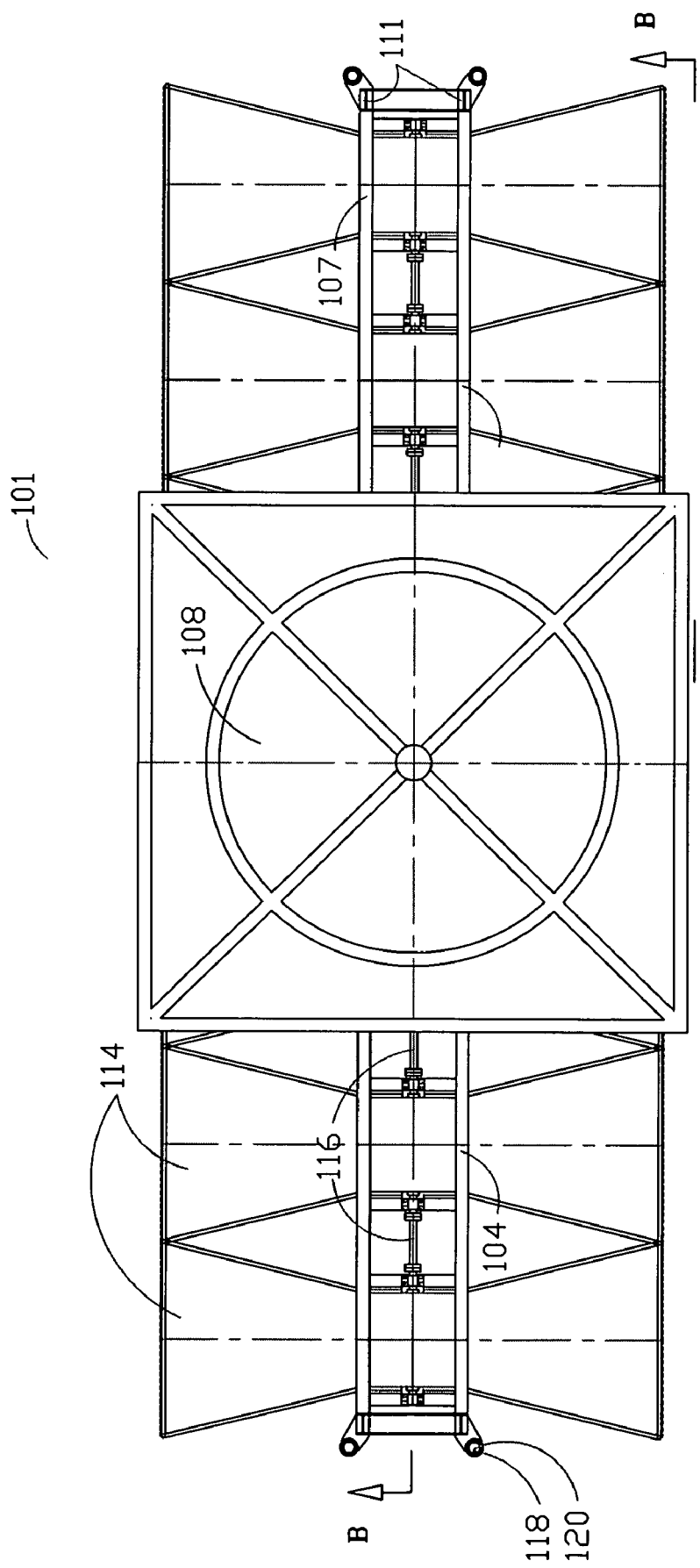
Figure 3:
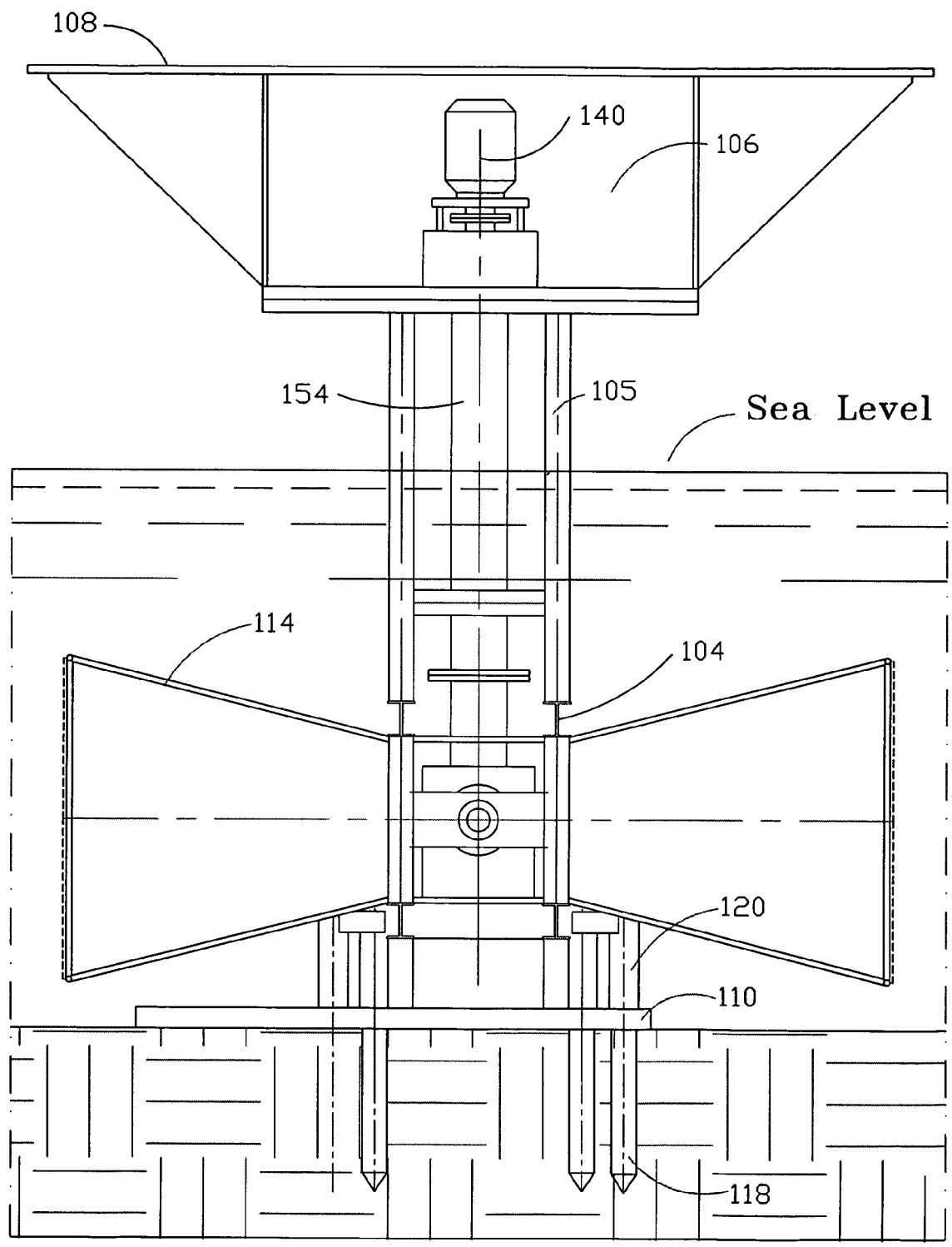
Figure 4:
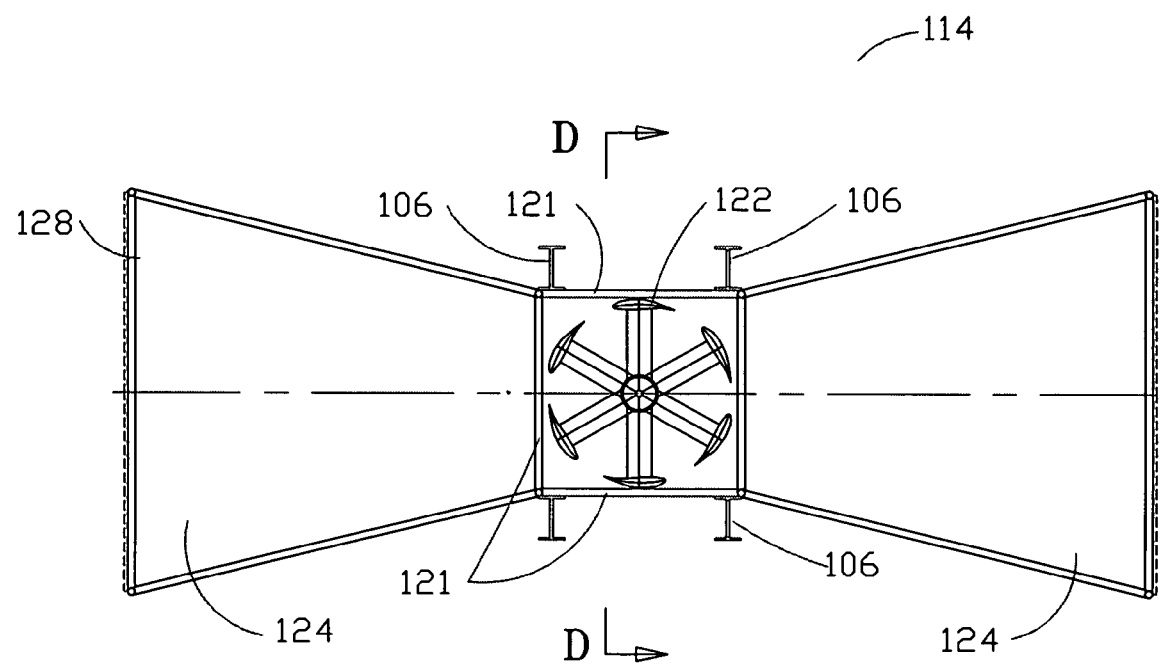
Figure 5:
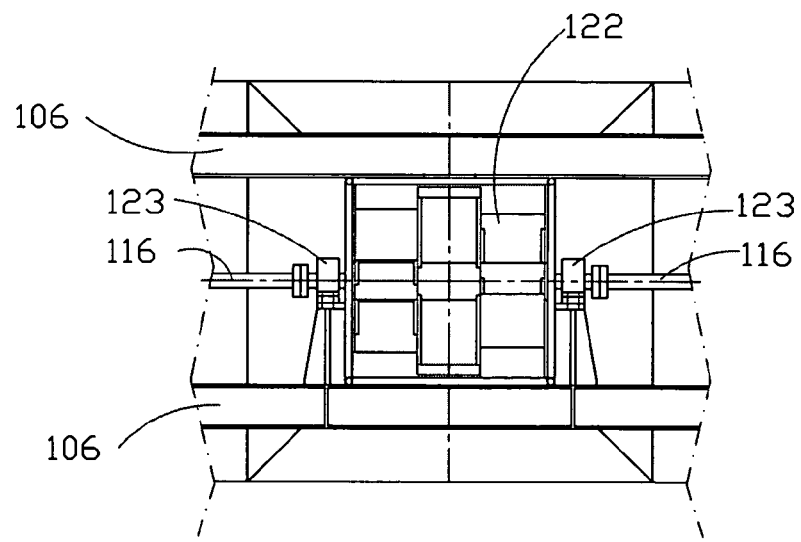
Figures 6, 7:
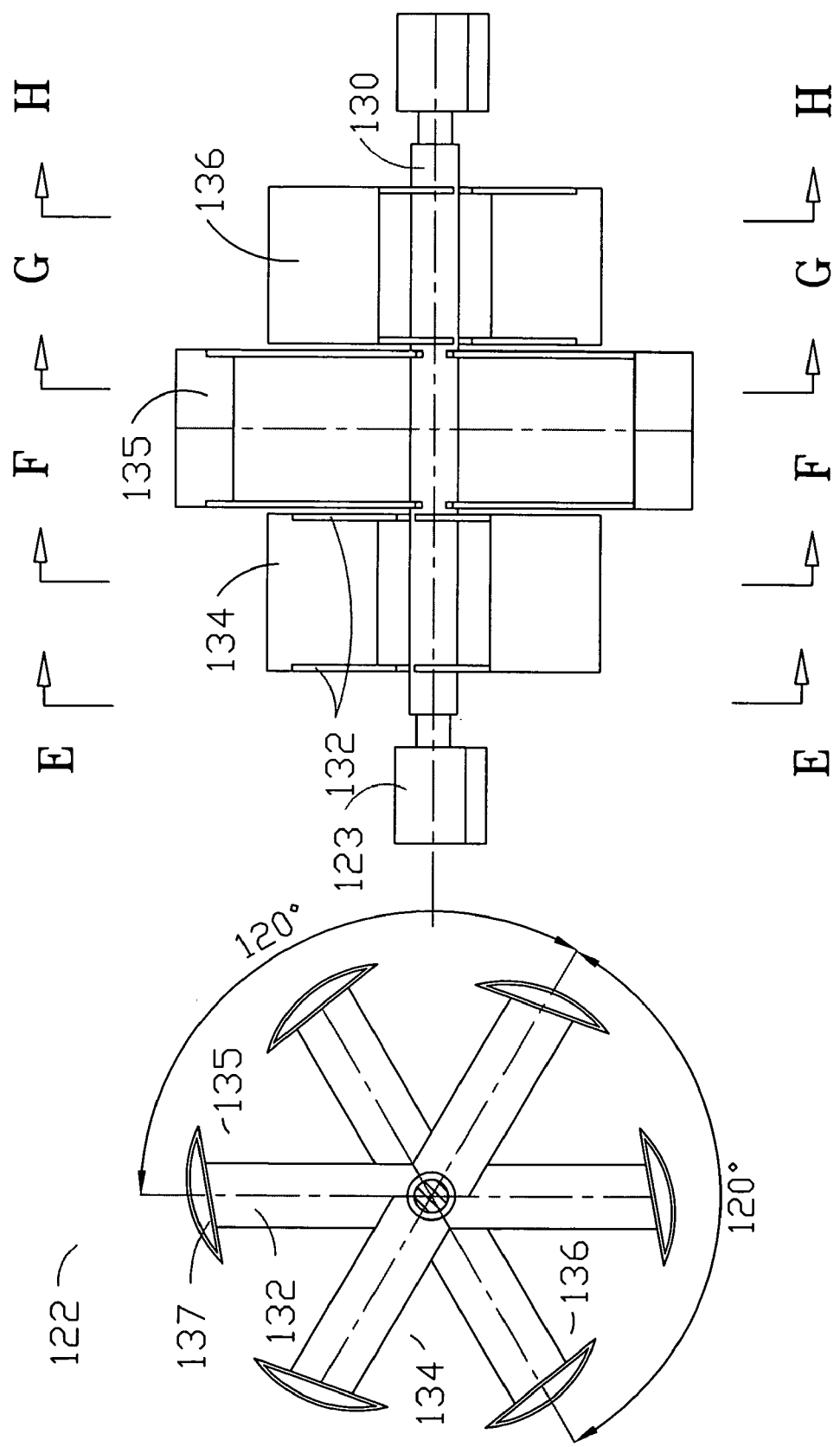
Figure 8:
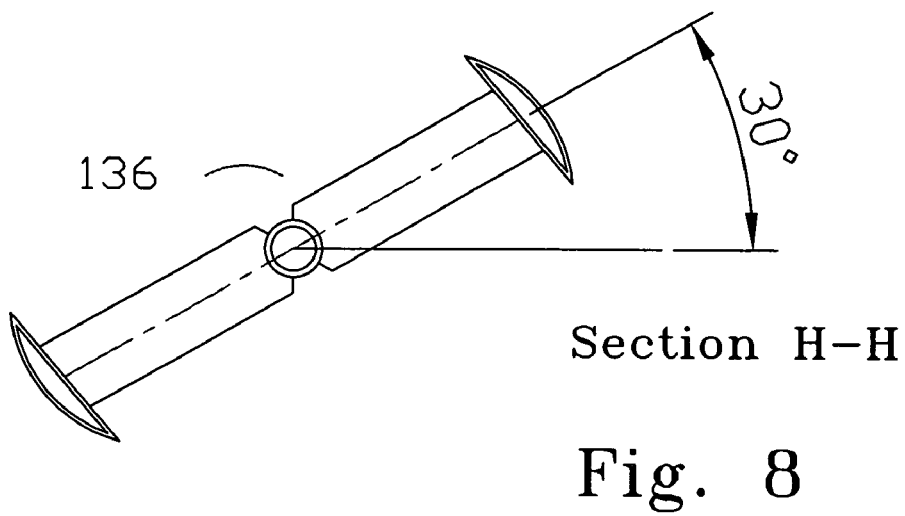
Figure 9:
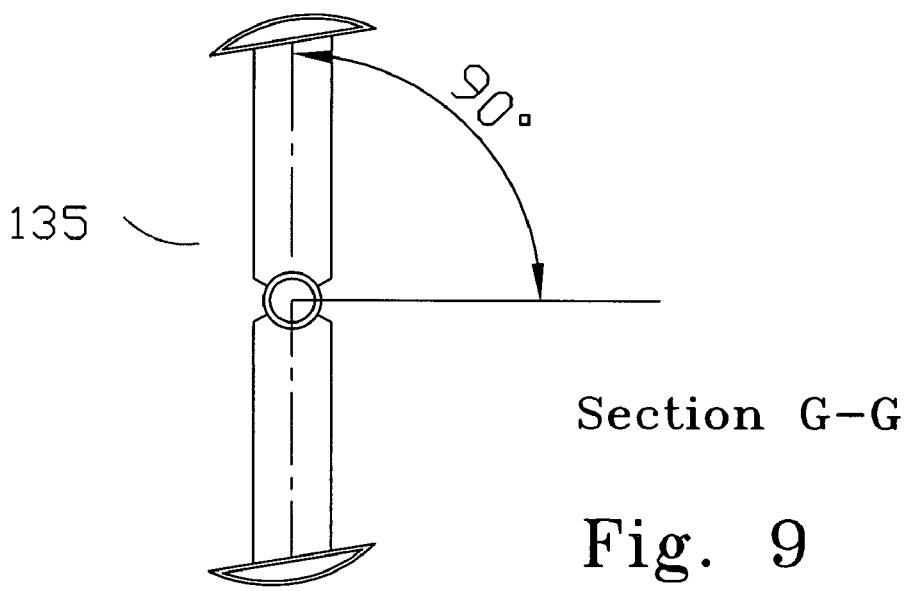
Figure 10:
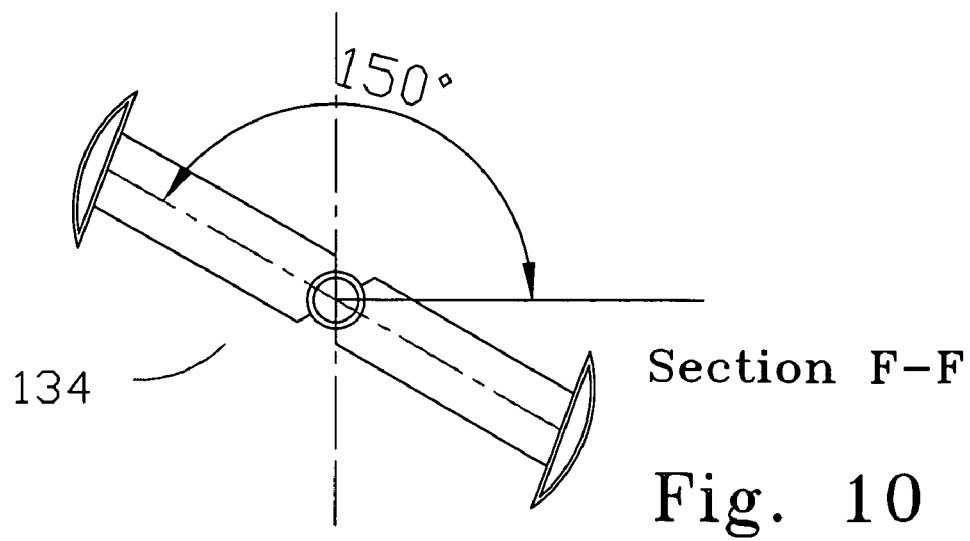
Figure 11:
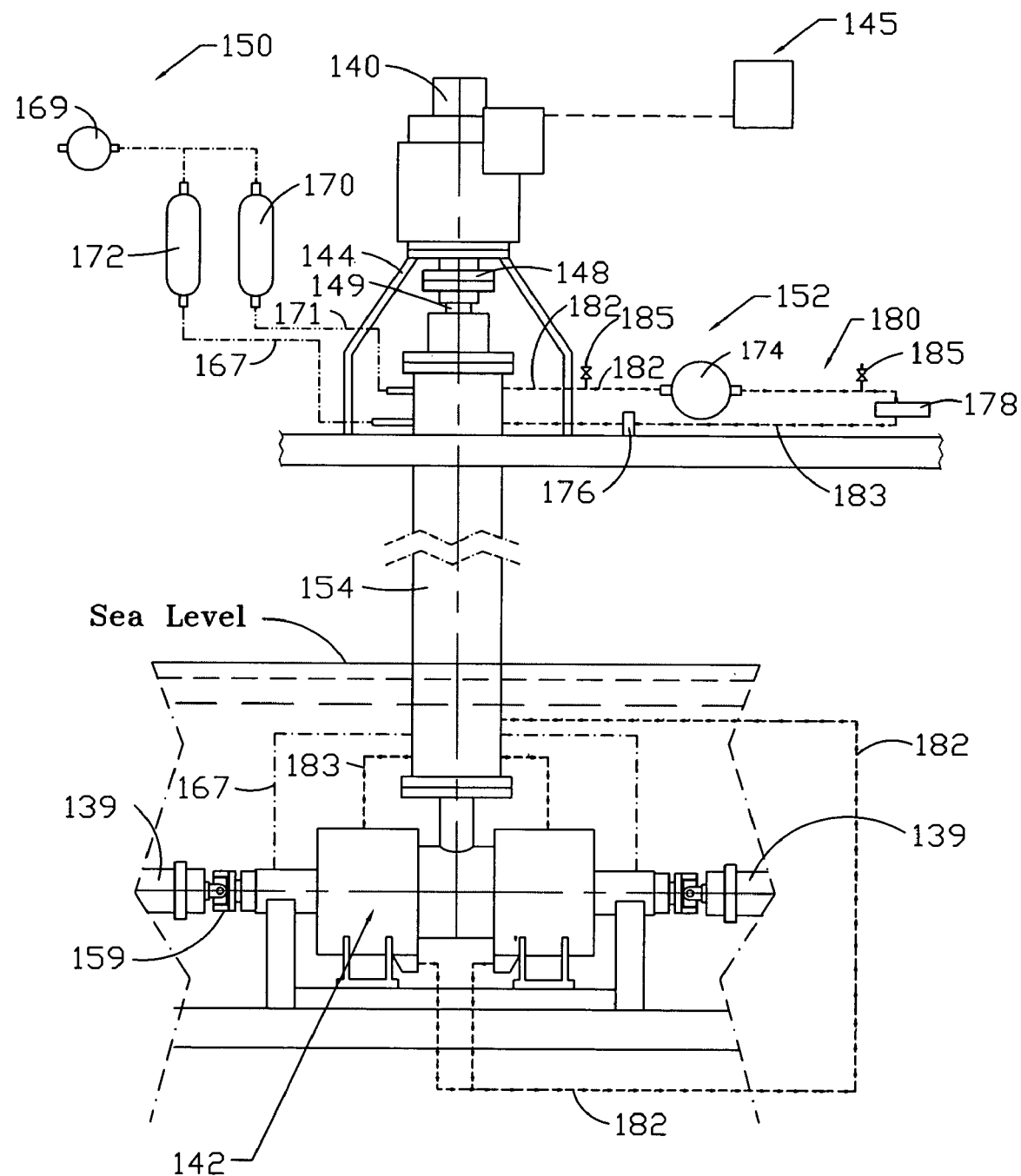
Figure 12:
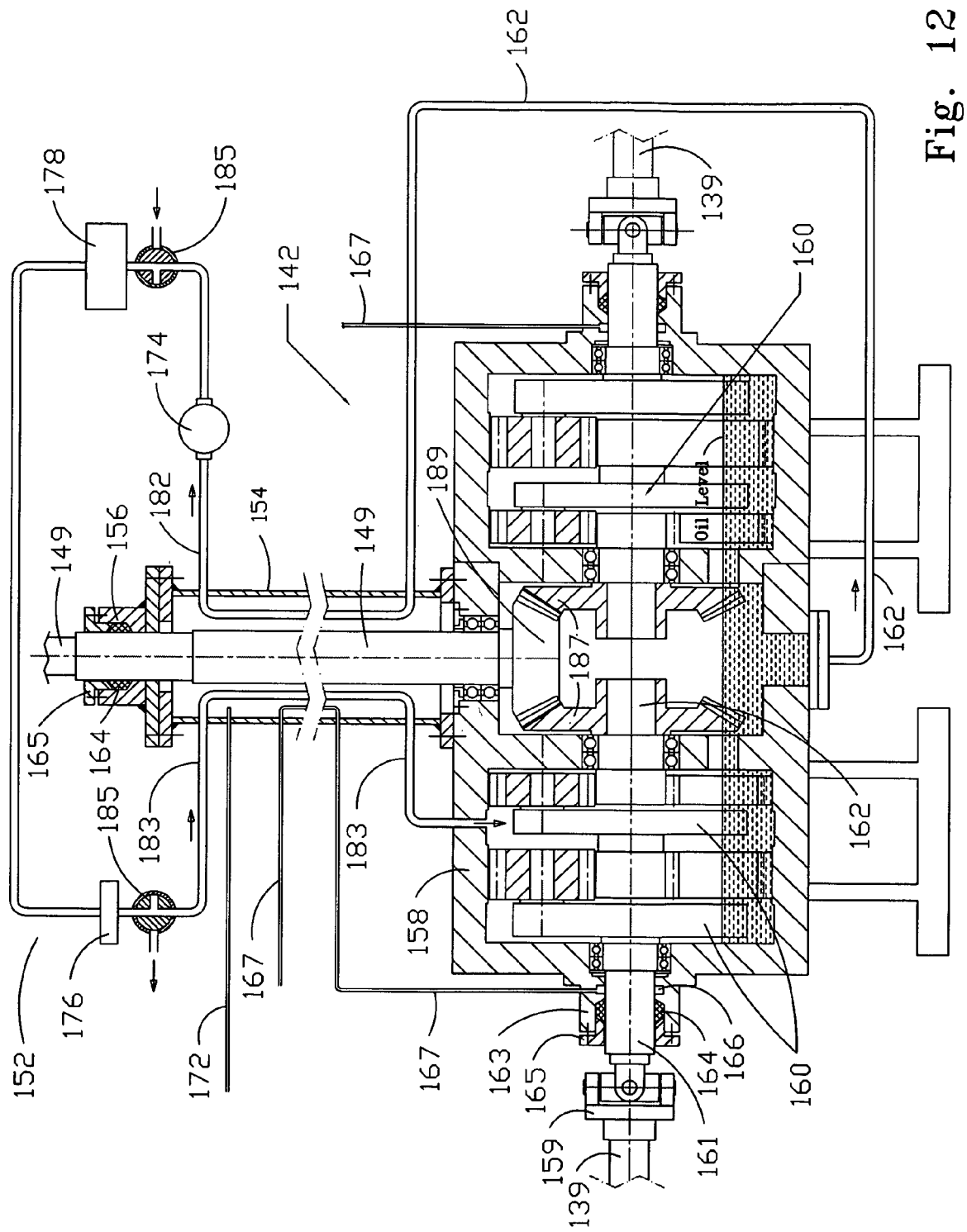

FIG. 1—Elevation, Section B-B from FIG. 2.
FIG. 2—Plan.
FIG. 3—Section A-A from FIG. 1.
FIG. 4—Section C-C from FIG. 1.
FIG. 5—Section D-D from FIG. 4.
FIG. 6—Turbine wheel, Elevation.
FIG. 7—Turbine wheel, Section E-E from FIG. 6.
FIG. 8—Blades, Section F-F from FIG. 6.
FIG. 9—Blades, Section G-G from FIG. 6.
FIG. 10—Blades, Section H-H, from FIG. 6.
FIG. 11—Schematic of Power transmission.
FIG. 12—Schematic of gearbox.

BRIEF DESCRIPTION OF IHET (EMBODIMENT II) DRAWINGS

Figure 13:
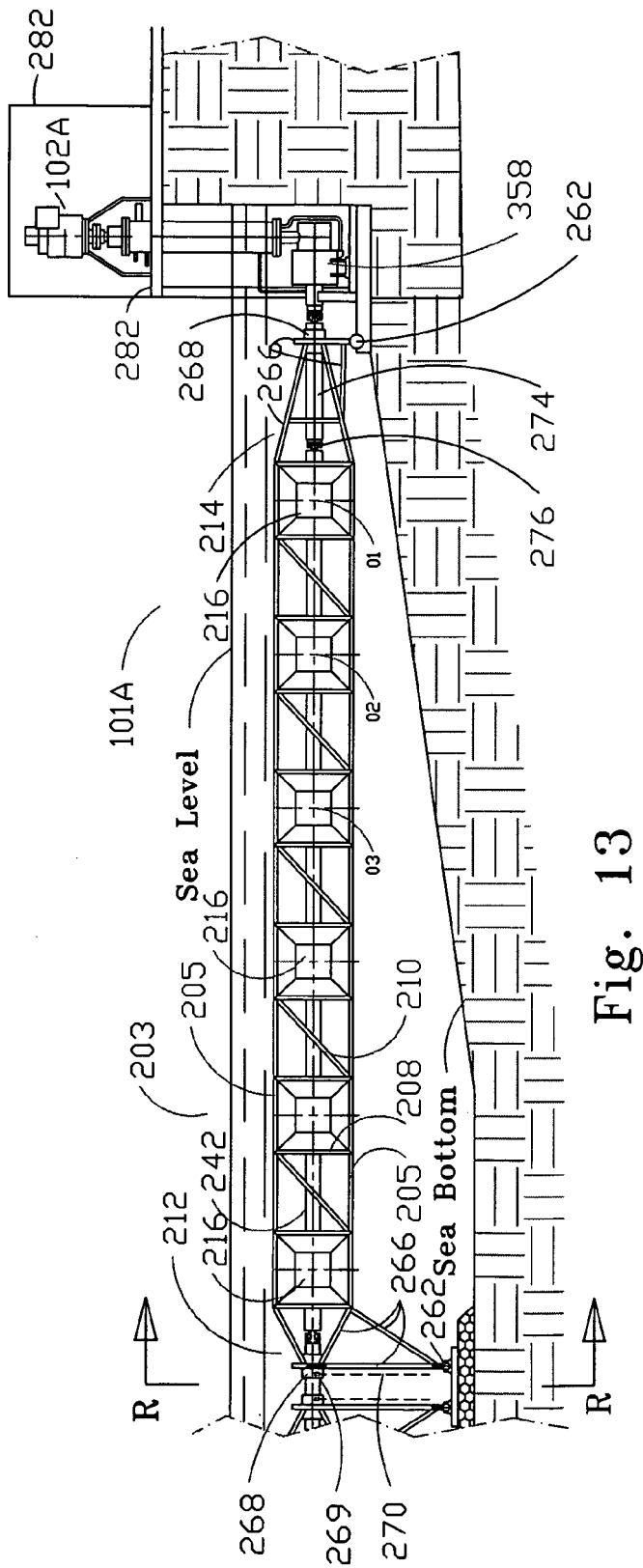
Figure 15:
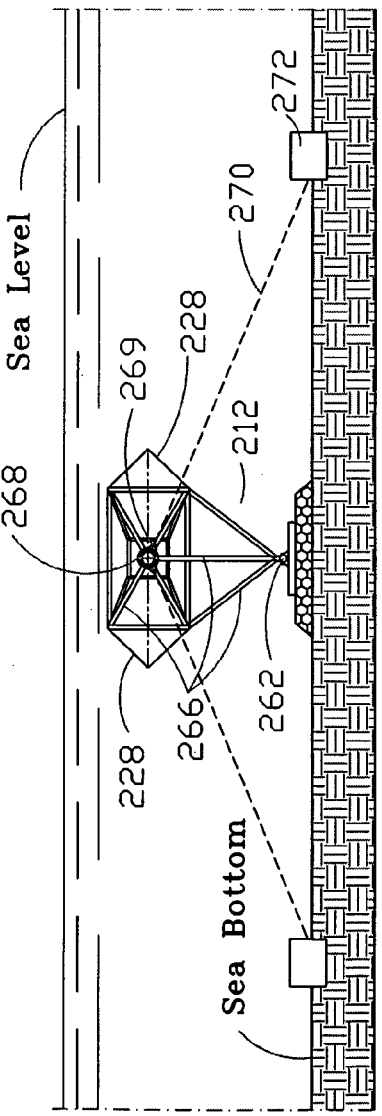
Figure 14:
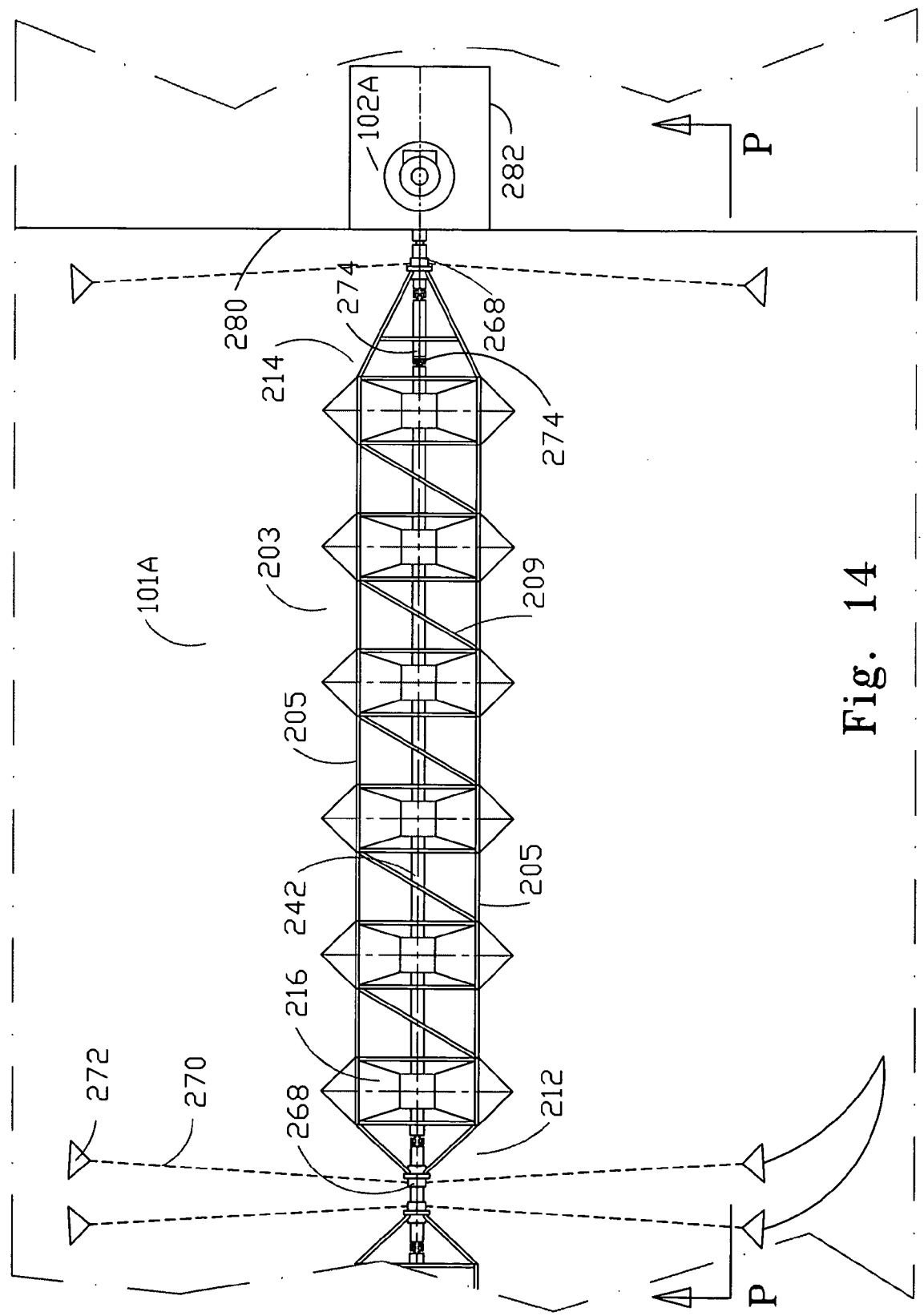
Figure 24:
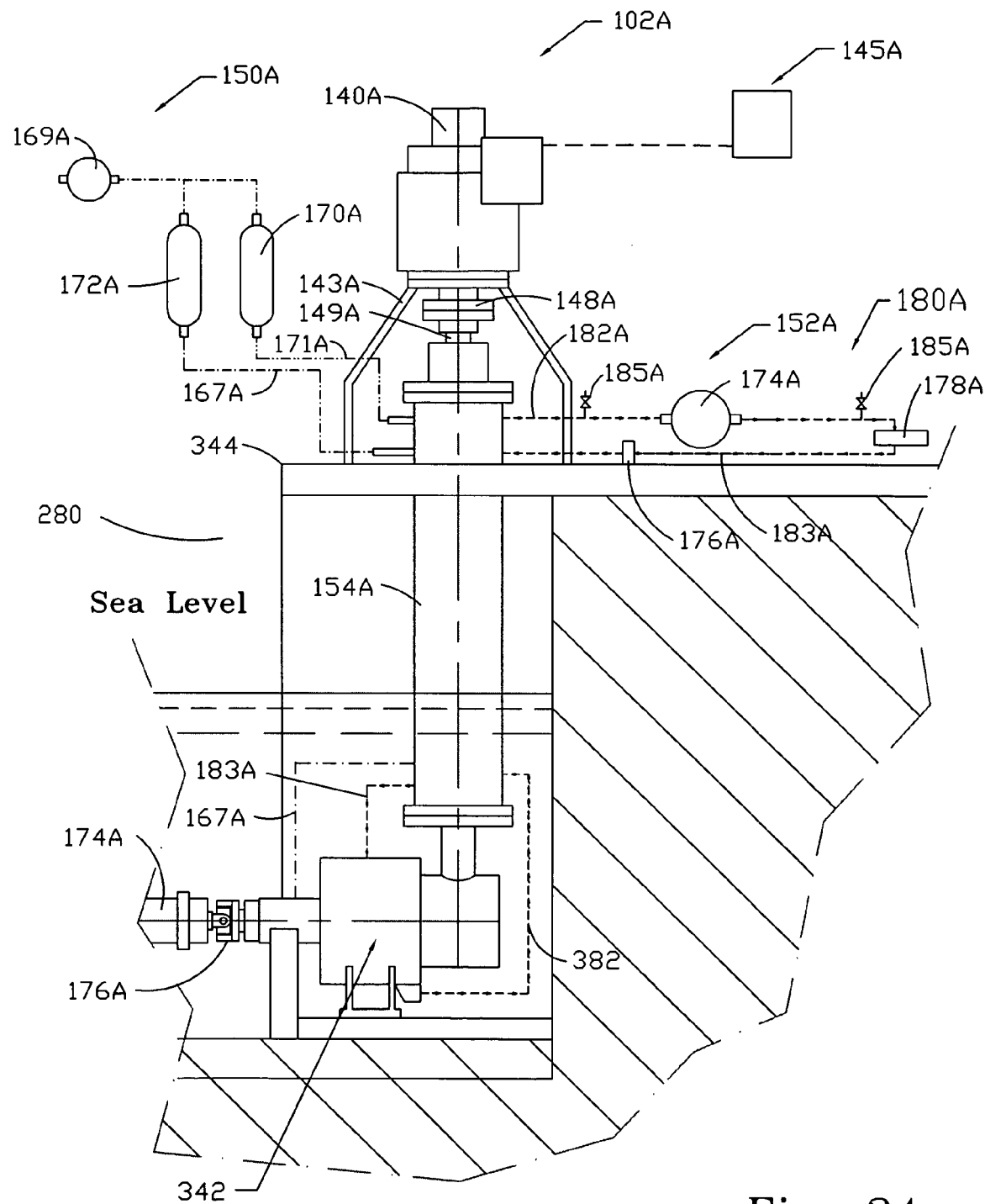
Figure 25:
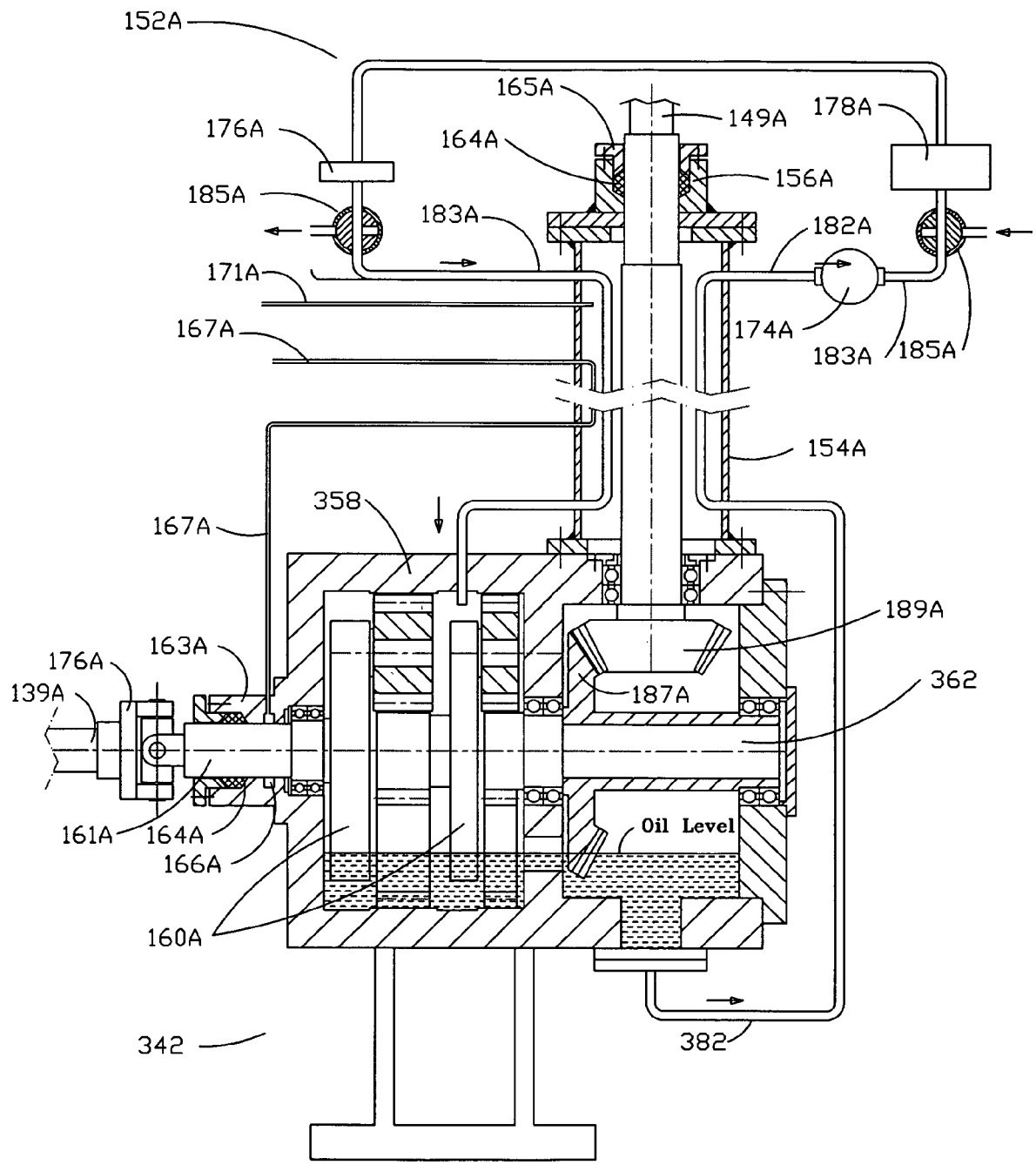
Figure 28:
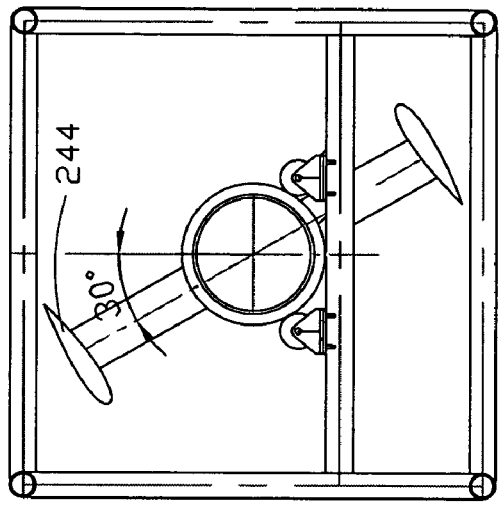
Figure 27:
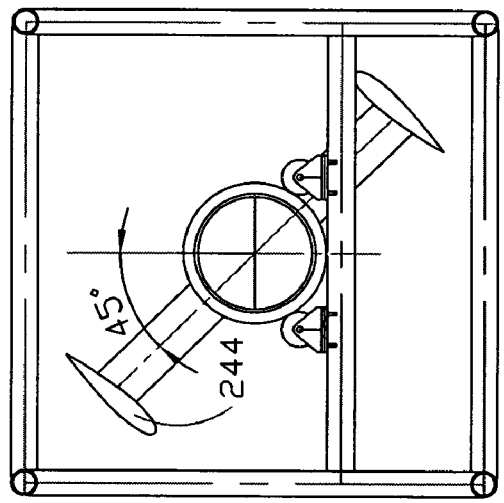
Figure 26:
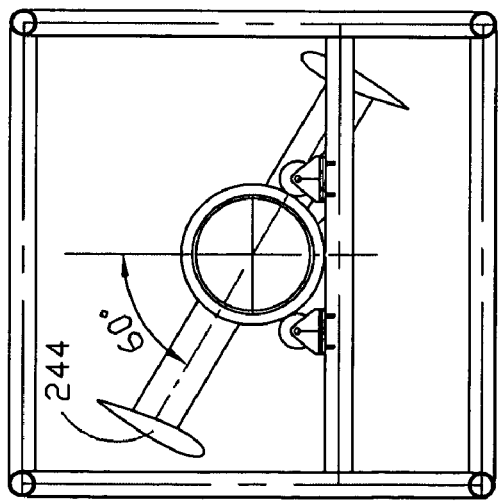
Figure 29:
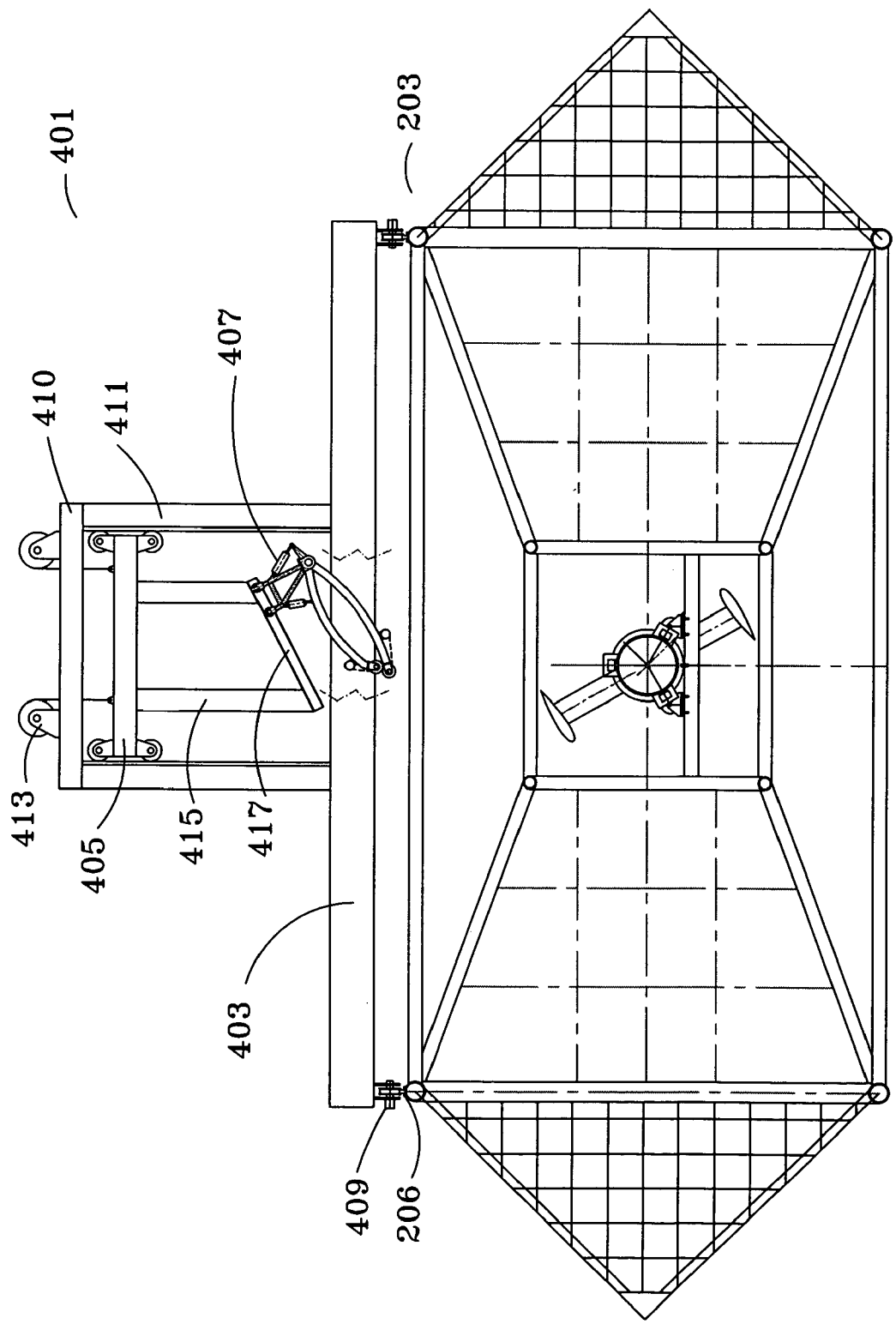
Figure 30:
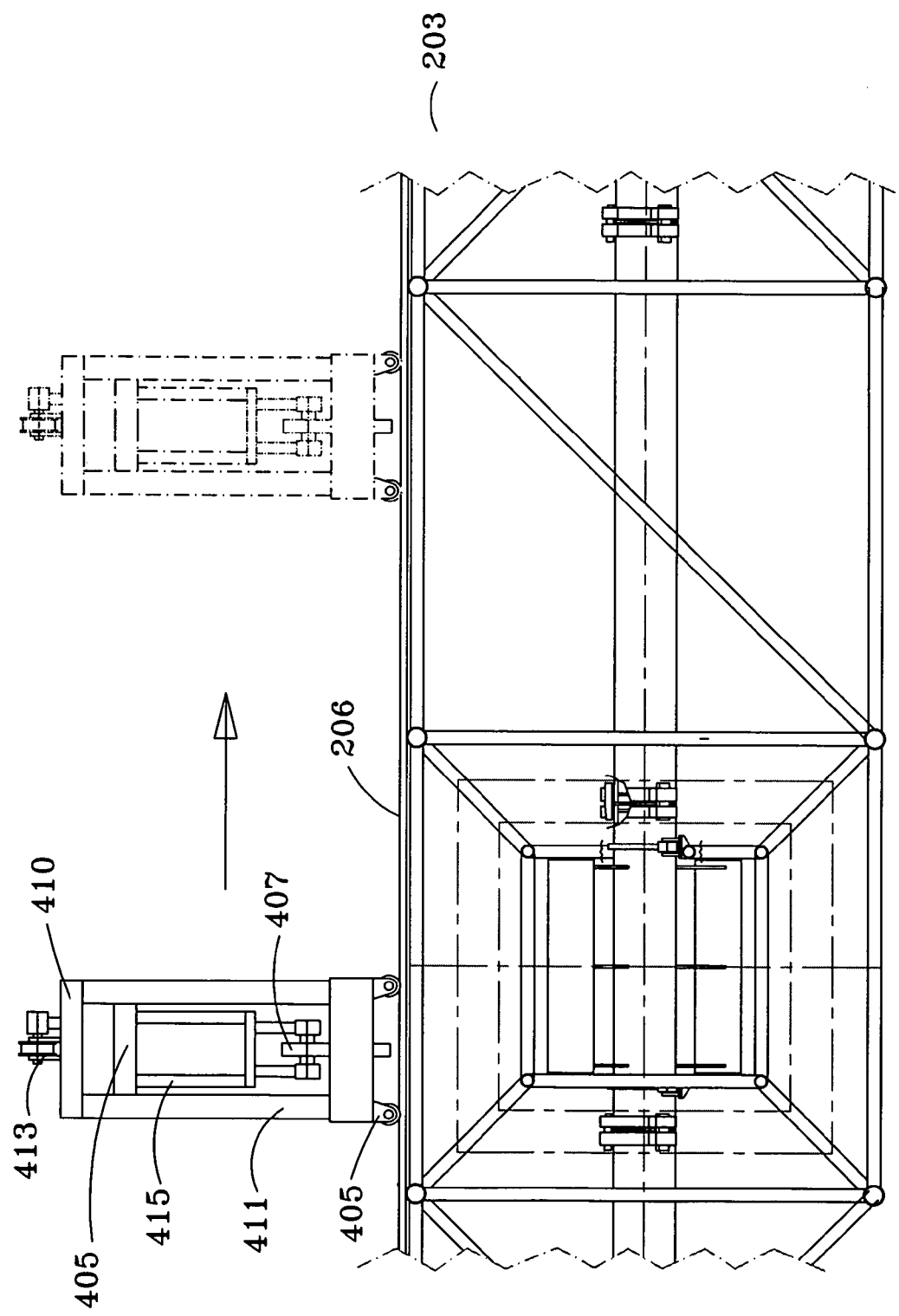
Figure 31:
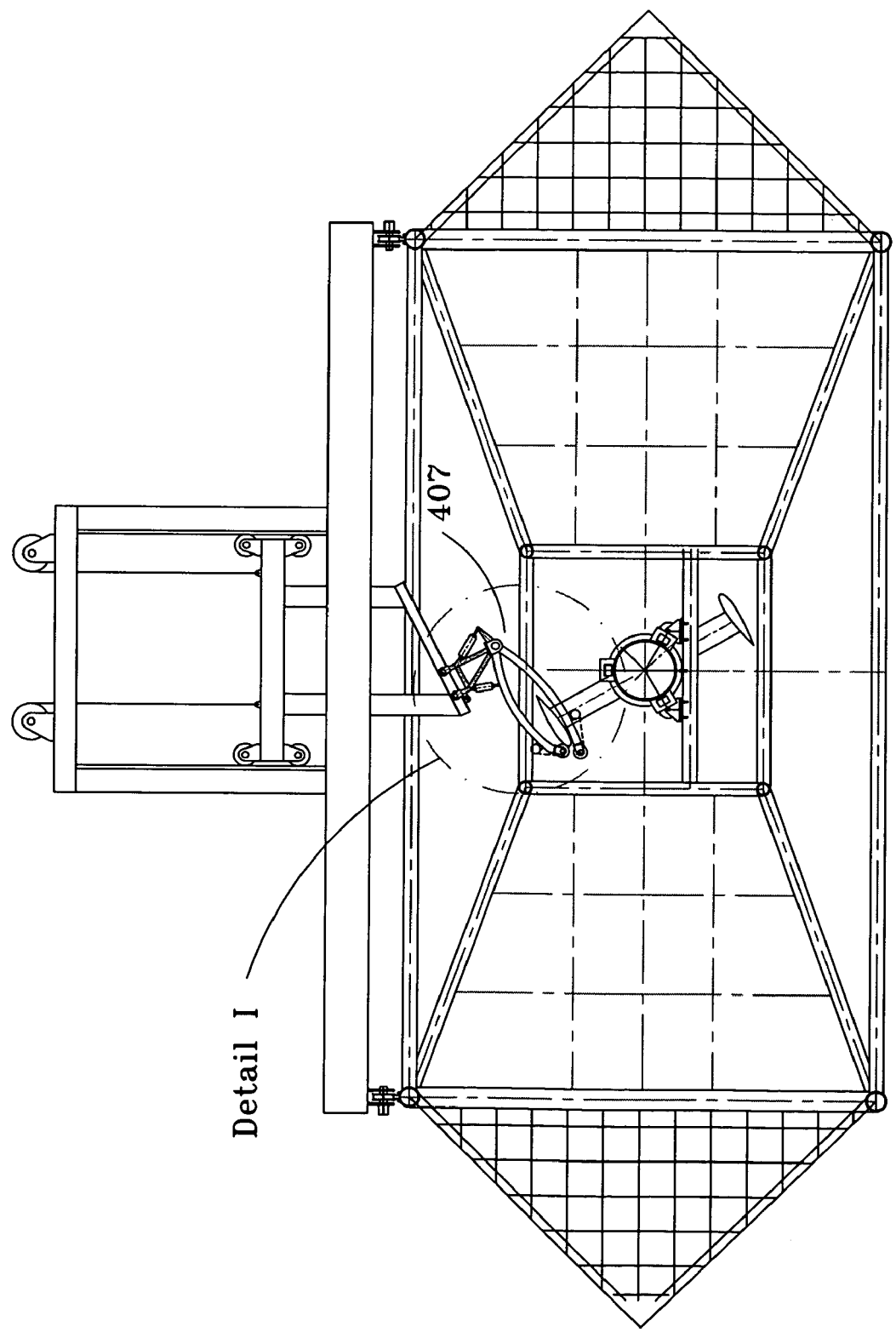
Figure 32:
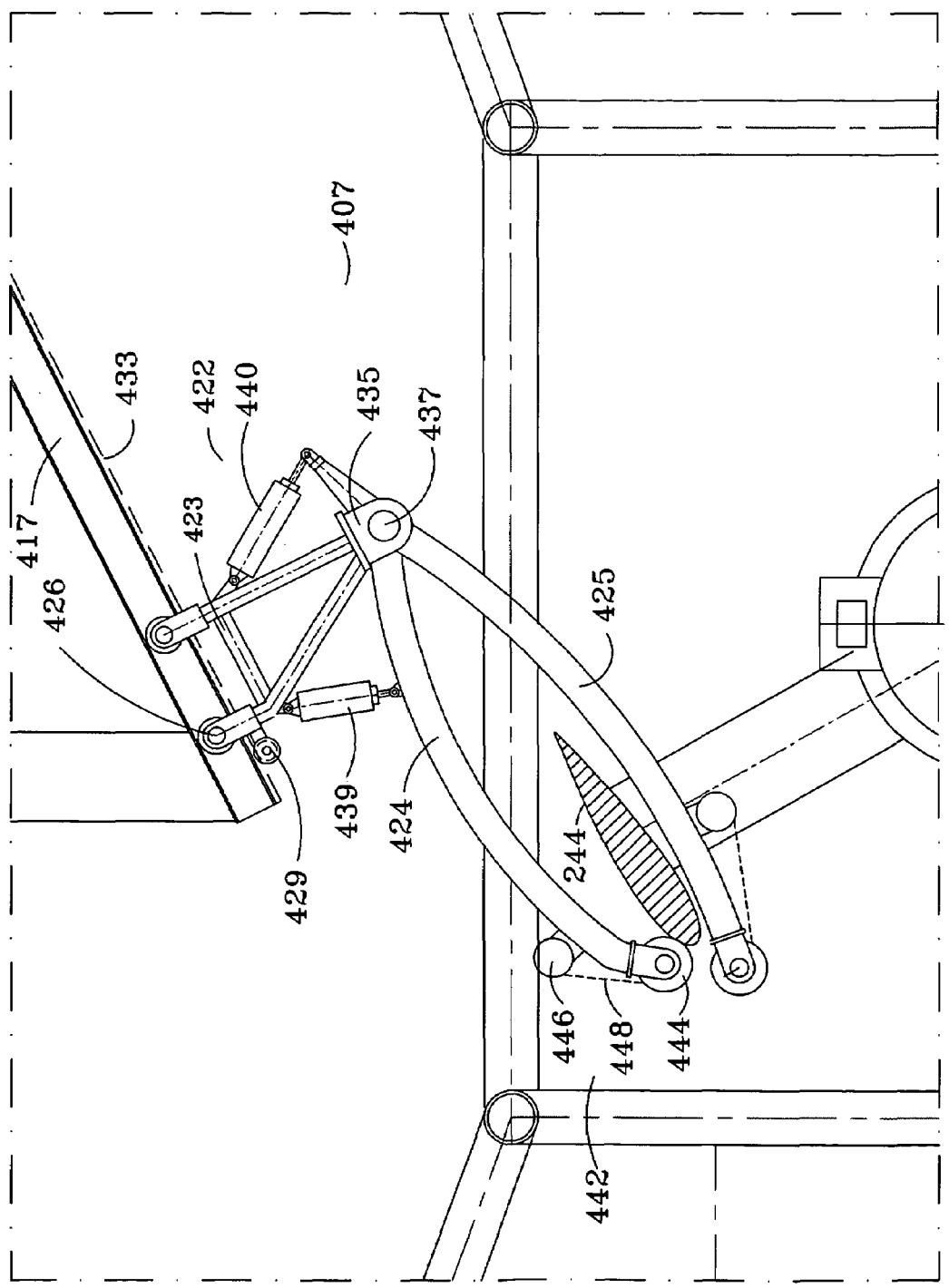
Figures 33, 34:
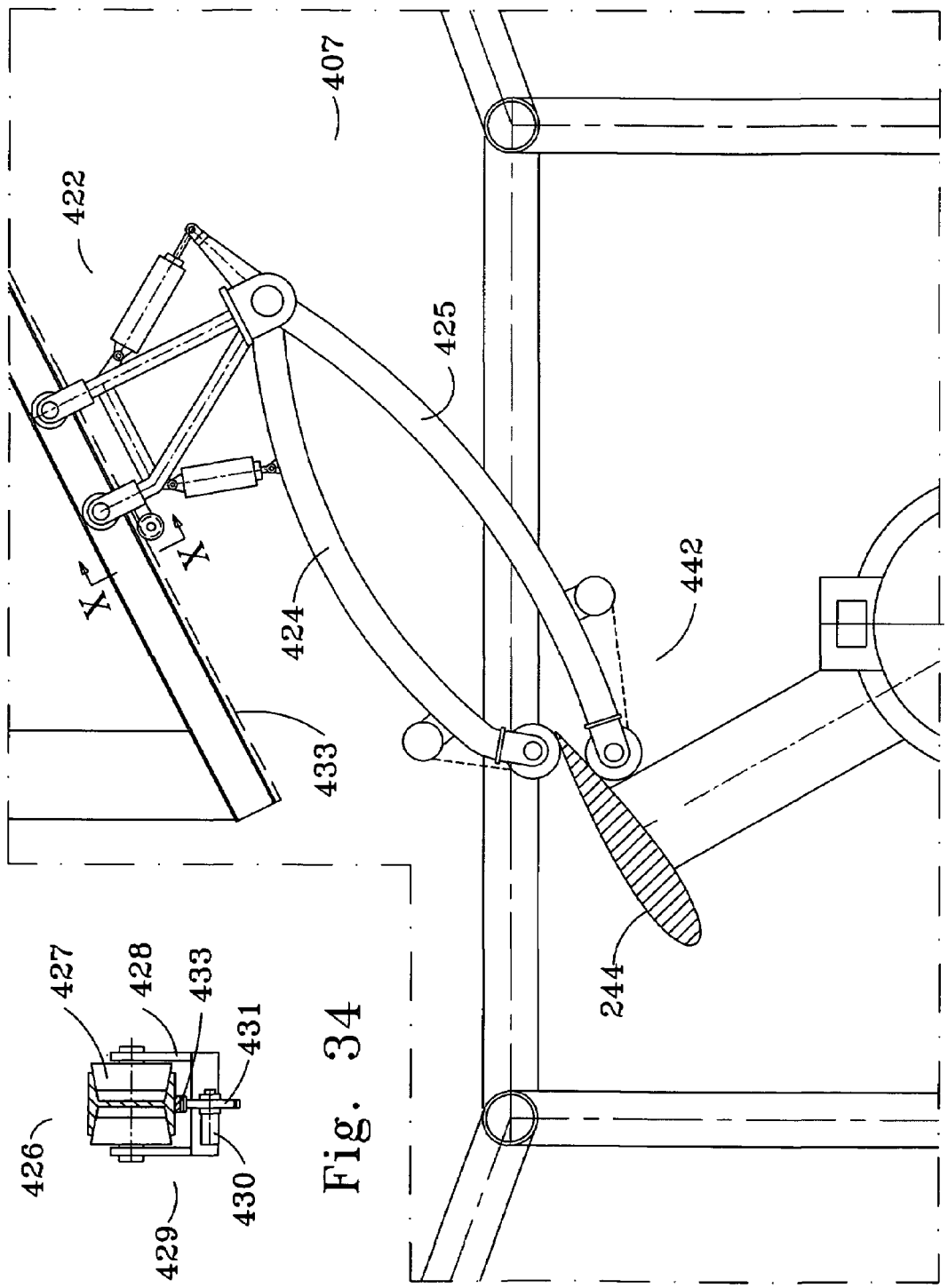

FIG. 13—IHET Elevation, Section P-P from FIG. 14.
FIG. 14—IHET Plan.
FIG. 15—Section R-R from FIG. 13.
FIG. 16—Elevation S-S of turbine unit from FIG. 17.
FIG. 17—Side View of turbine unit.
FIG. 18—Plan of turbine unit.
FIG. 19—View T from FIG. 17.
FIG. 20—Elevation of turbine cage.
FIG. 21—Side View U-U of turbine cage from FIG. 20.
FIG. 22—Plan of turbine cage.
FIG. 23—Section V-V of shafts coupling from FIG. 20.
FIG. 24—Schematic of Power transmission.
FIG. 25—Schematic of gearbox.
FIG. 26—Section through turbine cage 01 from FIG. 13.
FIG. 27—Section through turbine cage 02 from FIG. 13.
FIG. 28—Section through turbine cage 03 from FIG. 13.
FIG. 29—Blade cleaning installation in transport mode.
FIG. 30—Side view of Blade cleaning installation.
FIG. 31—Blade cleaning installation in operating mode.
FIG. 32—Detail I from FIG. 31 showing Blade cleaning machine in operating position I.
FIG. 33—Detail I from FIG. 31 showing Blade cleaning machine in operating position II.
FIG. 34—Section X-X from FIG. 33.

DETAILED DESCRIPTION OF EMBODIMENT I

FIGS. 1, 2 and 3 show general arrangement of the IHET. The IHET 101 consists of a Powerhouse 102 and frame 104. Frame 104 has in the middle Powerhouse support tower 105, on the top of which is located machinery housing 106, roof of which serves as a helicopter platform 108. On each end of the frame 104 are located a pair of vertical columns 111, which have (base) 110 that rest on sea bottom. On each half of the frame 104 are located Darrieus turbines 114, which are interconnected by short shafts 116 to rotate as a common shaft. Frame 104 is fixed to sea bottom by piles 118 through guides 120 attached to base 110. Darrieus turbines 114 (FIGS. 4 and 5) consist of a turbine housing 121, turbine wheel 122 with two support bearings 123 and two funnels 124, attached to the opposite sides of turbine housing 121. Each funnel on its input opening has screens 128 for preventing large fish to go into turbine.

FIGS. 6 and 7 illustrate design of a turbine wheel 122, which consists of central shaft 130, three turbine-wheel's sections 134, 135 and 136. FIGS. 8, 9 and 10 are illustrating orientation of sections F-F; G-G; and H-H in plane. Each turbine-wheel section consists of one pair of blades 137, which are connected to central shaft 130 by spokes 132. Sections F-F; G-G; and H-H show how the two-blade turbine wheels are staggered in a plane on 120°. FIG. 6 also shows how turbine-wheel sections are positioned along the shaft 130. Thus forms a turbine with 6 blades from three sections each having 2 blades and allows, having a turbine with two-blade turbine-wheels, to achieve the highest efficiency of two-blade turbine-wheel with a smoothness of 6 blades turbine, which minimizes vibration and makes turbine self-started.

FIGS. 1, 3, 11 and 12 show Powerhouse 102 and systems which they contain. It is positioned on the top of support tower 105. Among systems located inside it are: generator 140 connected to 90-degrees gearbox 142, electronic controls 145, a system 150 for keeping air pressure inside 90-degrees gearbox above the hydrostatic pressure of water on the sea bottom and a remote operating lubricating system 152 for cooling, changing and cleaning oil in the 90-degrees gearbox.

Generator 140 is connected to the top of support tower 105 by an intermediate support 144 and through a rigid coupling 148 and vertical shaft 149 with two groups of Darrieus turbines 114 through a 90-degrees gearbox 142.

The gearbox 142 includes housing 158 that contain two sets of planetary gears 160, located symmetrically to the gearbox 142 centerline. Each of the both gear sets 160 has input shaft 161, which through universal joint 159 is connected with one of the Darrieus turbines 114 through shafts 139. Each input shaft 161 has a housing 163 in which a seal 164 and compression bushing 165 are located. Also housing 163 has a cavern 166 to which pipe 167 with compressed air is connected. Each set of planetary gears 160 has output shaft 162 with bevel gear 187, which are engaged with central bevel gear 189, which is located in the middle of 90-degrees gearbox 142 and is connected to vertical shaft 149.

The system 150, for keeping air pressure inside 90-degrees gearbox above the hydrostatic pressure of water on the sea bottom, includes internal space of a vertical column (154) and internal space of 90-degrees gearbox 142. The vertical column 154 has on its upper part a housing 156, a seal 164 with compression bushing 165. The system 150 consists of: compressor 169, accumulator 170, accumulator 172, pipeline 171 and pipeline 167. Pipeline 171, which is connected to accumulator 170, supplies compressed air to internal compartments of vertical column 154 and 90-degrees gearbox 142. Pipeline 167, which is connected with accumulator 170, supplies compressed air to caverns 166.

The remote operating lubricating system 152 for cooling, changing and cleaning oil in the 90-degrees gearbox 142 consists of a pump 174, a filter 176, heat exchanger 178 and pipeline loop 180 consisting of suction line 182 and pressure line 183. The suction line 182 and pressure line 183 have valves 185, which allow emptying entire system from old oil and refilling it with fresh oil.

DETAILED DESCRIPTION OF EMBODIMENT II

FIGS. 13, 14 and 15 show a general arrangement of the IHET 101A. The main parts of IHET are horizontal frame 203 and Power House 102A The frame 203 (see FIGS. 16, 17 and 18) consists of a four longitudinal beams 205 with rails 206, which are interconnected by cross beams 207 and 209, rear support 212 and front support 214. Inside frame 203 are located several turbine units 216 equally distributed along the frame 203. The Darrieus turbine 114A (FIGS. 16 through 19) has two funnels 218 on its both sides and in the middle it has a turbine cage 220. Each funnel 218 consists of four inclined beams 222 and four flat panels 224. The funnel inlet opening 226, which is formed by pair of horizontally oriented continuous longitudinal beams 205 and pair of vertical cross beams 208, has fish guard 228 comprising of four light beams 230 and four panels 232 made from fish net. The vertical cross beams 208 are interconnected by cross beams 210. The turbine cage 220 (FIGS. 20 through 23) consists of turbine wheel 122A, cage 236, bearing-support arrangement 238, a pair of connecting coupling 240 and intermediate shaft 242.

The turbine wheel 122A consists of pair of blades 137A, spokes 132A and central shaft 130A with a pair of centering rings 250. The bearing-support arrangement 238 consists of support beam 252 and pair of rollers 254 engaged with centering ring 250 of turbine wheel 122A. Connecting coupling 240 consist of three wedge-centering units 256 equally distributed along the perimeters of turbine wheel central shaft 130A and intermediate shaft 242. Each wedge-centering unit 256 consists of two blocks 258 with square opening and one square wedge 260, which fits into openings in blocks 258.

The ends of rear support 212 and front support 214 (see FIG. 13) of frame 203 have a set of inclined beams connected with hollow hub 268 on each end of frame 203.) The hollow hubs 268 (see FIG. 15) have two ears 269 to which are connected mooring lines 270, which secure frame 203 to anchors 272 located on the sea bottom. The connecting end shaft 274, which passes through hollow hub 268 and has on its ends universal joints 276, transmits torque from Darrieus turbines 114A to Power House 102A.

FIGS. 13 and 14 show Power House 102A, which is located on the edge of embankment 280 and under shed 282, and systems that it contains. They include: generator 140A, which receives rotation from groups of Darrieus turbines 114A located in frame 203 through a 90-degrees gearbox 342. Generator 140A (see FIG. 240) is located on the top of intermediate support 143A, which is attached to foundation 344. It has electronic controls 145A and a system 150A for keeping air pressure inside 90-degrees gearbox 342 above the hydrostatic pressure of water on the sea bottom and a remote operating lubricating system 152A for cooling, changing and cleaning oil in the 90-degrees gearbox 342.

The 90-degrees gearbox 342 includes housing 358 that contain a set of planetary gears 160A. The planetary gear set 160A has input shaft 161A, which through universal joint 176A and short shaft 139A is connected with group of Darrieus turbines 114A located in frame 203. Each input shaft 161A has a housing 163A in which a seal 164A and compression bushing 165A are located. Also housing 163A has a cavern 166A to which pipe 168A with compressed air is connected. The set of planetary gears 160A has output shaft 162A with bevel gear 187A, which is engaged with horizontal bevel gear 189A and through it is connected to vertical shaft 149A.

The system 150A, for keeping air pressure inside 90-degrees gearbox above the hydrostatic pressure of water on the sea bottom, includes internal space of a vertical column 154A and internal space of 90-degrees gearbox 342. The vertical column 154A has on its upper part a housing 156A, a seal 164A with compression bushing 165A. The system 150A consists of: compressor 169A, accumulator 170A, accumulator 172A, pipeline 171A and pipeline 167A. Pipeline 171A, which is connected to accumulator 170A, supplies compressed air to internal compartments of vertical column 154A and 90-degrees gearbox 342. Pipeline 167A, which is connected with accumulator 172A, supplies compressed air to cavern 166A. The remote operating lubricating system 152A for cooling, changing and cleaning oil in the 90-degrees gearbox 342 consists of a pump 174A, a filter 176A), heat exchanger 178A and pipeline loop 180A having suction line 182A and pressure line 183A. The pipeline loop 180A consisting of suction line 182A, pressure line 183A and valves 185A, allows emptying entire system from old oil and refilling it with fresh oil.

FIGS. 29 through 34 illustrate system 401 for cleaning Darrieus turbine blades from growth on their surface. It consists of a horizontal carriage 403, vertical carriage 405 and blade-cleaning machine 407. The horizontal carriage 403 has 4 powered wheel arrangements 409 that move carriage 403 on rails 206 along the frame 203. It also has a central frame 410 with vertical guides 411. The vertical carriage 405 is located inside central frame 410 and between vertical guides 411. On the top of central frame 410 are located hoisting winches 413, which control vertical movement of vertical carriage 405. Vertical carriage 405 has internal frame 415 with inclined guide rails 417.

The blade-cleaning machine 407 (FIGS. 32 and 34) consists of a frame-carriage 422, upper arm 424 and lower arm 425. Frame-carriage 422 has a support frame 423 to which are attached 4 wheel-assemblies 426, each having a pair of wheels 427, which are assembled on a common block 428 and are engaged with vertical carriage 407 inclined guide rails 417. The frame-carriage 422 has drive assembly 429 that includes hydraulic motor 430, rack pinion 431 and gear-rack 433 attached to incline guide rail 417. The upper part of frame 423 has a head 435 with a pin 437, which serves as a common pivot axis for both upper arm 424 and lower arm 425. The frame 423 serves as a base for two actuation hydraulic cylinders 439 and 440, which control position of lower and upper arms 424 and 425 correspondingly. Each arm has on its end a cleaning head 442, which consist of a powered brush 444, drive 446 and chain 448 that transmits rotation from drive 446 to powered brush 444.

What is claimed is:

1. A stationary installation for converting kinetic energy of tides into electricity in shallow waters and in narrow straits or rivers near coastal line utilizing Darrieus type in combination with funnel and consisting of a number of two-blade wheels staggered equally around 3600 and along of a common shaft, comprising:
 a group of submerged Darrieus turbines with funnels, having their horizontally located axis of rotation oriented perpendicular to direction of water current, and connected to a 90-degrees gearbox having output shaft oriented vertically and connected with a generator; is housed by an elongated structure having one end of it incorporated into shoreline;
 each of said group of Darrieus turbines have their turbines interconnected to each other through their axis of rotation by short shafts forming one common shaft;
 said elongated structure, having at least two support points and at least two pair of anchoring means undertaking current horizontal force, contains:
 a powerhouse, which is located above sea level and incorporated into shoreline is interconnected on its lower underwater part with the end of said common shaft of said group of Darrieus turbines, which protrudes from the end of said elongated structure coming to the shore line, contains:
 a generator, oriented vertically and located in the upper part of said powerhouse and interconnected with 90-degrees gearbox through a vertical shaft,
 said 90-degrees gearbox, which transmits horizontal rotation of said Darrieus turbines to said vertically oriented generator, and which is located on the bottom of said powerhouse and is interconnected with said end of said common shaft of said group of Darrieus turbines, means for keeping inner space of said 90-degrees gearbox from being flooded,
 a remote operating means for cleaning, cooling and changing oil in said 90-degrees gearbox
 means for cleaning Darrieus turbine blades from growth on their surface in a semi-automated mode.

2. The stationary installation by claim 1, wherein said 90 degrees gearbox, which transmits horizontal rotation of said Darrieus turbines to said generator located in said powerhouse, and which is located on the bottom of said powerhouse and is interconnected with said end of said common shaft of said group of Darrieus turbines, comprising:
 a housing, which includes a set of planetary gears, having input shaft connected through universal joint with said turbine group common central shafts and output shaft,
 a bevel gear transmission consisting of input bevel gear attached to said planetary gears output shaft and engaged with output bevel gear attached to lower end of said vertical shaft transmitting rotation to said generator.

3. The stationary installation by claim 1, wherein said means for keeping inner space of said 90 degrees gearbox from being flooded, comprising:
 a system of compressed air that keeps pressure inside said gearbox above the hydrostatic pressure of water surrounding said gearbox comprising:
 a vertical column, the upper end of which is located in the room of said powerhouse and lower end is attached to upper part of said 90 degrees gearbox, forms a common hermetic inner space with said 90 degrees gearbox,
 an upper seal arrangements, which is located on upper part of said vertical column and positioned inside of said powerhouse, is engaged with said central vertical shaft,
 a lower seal arrangement on the said 90 degree gearbox input shafts, having means for controlling their tightness manually by diver,
 a compressor, an accumulator and a pipeline, which delivers compressed air into said 90 degrees gearbox hermetic inner space.

4. The stationary installation by claim 1, wherein said remote operating means for cleaning, cooling and changing oil in said 90-degrees gearbox, comprising:
 an oil pump, filter and oil cooling heat exchanger all located in said powerhouse and interconnected with inner space of said 90 degree gearbox located on the sea bottom through a pipeline loop that consists of suction and pressure lines.

5. The stationary installation by claim 1, wherein said means for cleaning Darrieus turbine blades from growth on their surface in a semi-automated mode, comprising:
 a horizontal carriage running along the IHET frame,
 a vertical carriage, which moves in vertical guides assembled on said horizontal carriage, having guide rails for blade cleaning machine,
 said blade cleaning machine consisting:
 a frame-carriage,
 two arms having a joint pivot axis,
 each said arm has one actuating hydraulic cylinder and one cleaning head,
 said cleaning head consists of a brush, support and a powered drive, which transmits rotation to said brush through a chain.

6. The stationary installation by claim 1, wherein said group of Darrieus turbines, comprising:
 two subgroups of said group of Darrieus turbines located symmetrically to said powerhouse and to said 90-degree gearbox;
 said 90-degree gearbox has two sets of said planetary gears and input bevel gear symmetrically located around said output bevel gear axis of vertical rotation;
 said ends of common shaft of said two subgroups are connected through universal joints with corresponding said input shafts of said planetary gearings inside said 90-degree gearbox;
 said two subgroups of Darrieus turbines and said powerhouse are assembled on a common base, which is anchored to sea bottom.

* * * * *